US012053808B2

(12) United States Patent
Anderson

(10) Patent No.: US 12,053,808 B2
(45) Date of Patent: Aug. 6, 2024

(54) MULTI-PHASE STORAGE VESSEL CLEANING AND MAINTENANCE SYSTEM AND METHOD OF USE

(71) Applicant: Wildyn Blane Mayfield Anderson, Hampton, TN (US)

(72) Inventor: Wildyn Blane Mayfield Anderson, Hampton, TN (US)

( * ) Notice: Subject to any disclaimer, the term of this patent is extended or adjusted under 35 U.S.C. 154(b) by 0 days.

(21) Appl. No.: 17/337,669

(22) Filed: Jun. 3, 2021

(65) Prior Publication Data

US 2022/0388044 A1    Dec. 8, 2022

(51) Int. Cl.
| *B08B 9/093* | (2006.01) |
| *B01D 29/56* | (2006.01) |
| *B01D 29/90* | (2006.01) |
| *B01D 29/92* | (2006.01) |
| *B01D 35/147* | (2006.01) |

(52) U.S. Cl.
CPC ............ *B08B 9/0936* (2013.01); *B01D 29/56* (2013.01); *B01D 29/902* (2013.01); *B01D 29/925* (2013.01); *B01D 35/147* (2013.01); *B08B 9/0933* (2013.01); *B01D 2201/265* (2013.01); *B01D 2201/54* (2013.01); *B08B 2209/08* (2013.01)

(58) Field of Classification Search
CPC . B08B 9/0936; B08B 9/0933; B08B 2209/08; B01D 29/56; B01D 29/902; B01D 29/925; B01D 35/147; B01D 2201/265; B01D 2201/54
See application file for complete search history.

(56) References Cited

U.S. PATENT DOCUMENTS

| 4,015,613 | A | * | 4/1977 | Papworth | ............... B08B 9/093 |
| | | | | | 134/168 R |
| 4,153,553 | A | | 5/1979 | Davis | |
| 4,721,127 | A | | 1/1988 | Conlin | |
| 5,091,016 | A | | 2/1992 | Krajicek et al. | |
| 5,098,580 | A | | 3/1992 | Andersen | |
| 5,336,418 | A | | 8/1994 | Rawlins | |
| 5,409,025 | A | * | 4/1995 | Semler | ...................... B08B 9/08 |
| | | | | | 134/169 R |
| 5,544,669 | A | | 8/1996 | Manabe et al. | |
| 8,753,451 | B2 | | 6/2014 | O'Brien et al. | |
| 2004/0045343 | A1 | * | 3/2004 | Hutchinson | .............. B67D 7/66 |
| | | | | | 73/49.1 |
| 2009/0145853 | A1 | * | 6/2009 | Hilsman | ................... B60P 3/14 |
| | | | | | 210/85 |
| 2009/0308412 | A1 | | 12/2009 | Dixon | |
| 2010/0051057 | A1 | * | 3/2010 | Delaney | .............. B05B 13/0636 |
| | | | | | 134/167 R |
| 2010/0154828 | A1 | * | 6/2010 | Green | ...................... B08B 9/08 |
| | | | | | 134/21 |

(Continued)

FOREIGN PATENT DOCUMENTS

EP    2390013 A2    5/2011

*Primary Examiner* — Sharidan Carrillo
(74) *Attorney, Agent, or Firm* — Jonathan Brown

(57) ABSTRACT

A complete fuel tank maintenance and cleaning system. This apparatus and method are capable of effectively cleaning an underground or aboveground storage tank by implementing a multi-stage filtration and removal system, and effectively removing contaminants from tank surfaces by using the product or alternative as a streamed cleaning agent within the storage tank.

9 Claims, 11 Drawing Sheets

(56) References Cited

U.S. PATENT DOCUMENTS

| | | | |
|---|---|---|---|
| 2011/0284031 A1* | 11/2011 | Green | B08B 9/0933 |
| | | | 134/21 |
| 2011/0308624 A1* | 12/2011 | Kobryn | B67D 7/66 |
| | | | 137/565.29 |
| 2019/0151906 A1* | 5/2019 | Moore | B60S 5/00 |
| 2019/0232345 A1* | 8/2019 | Grooms | B67D 7/62 |

* cited by examiner

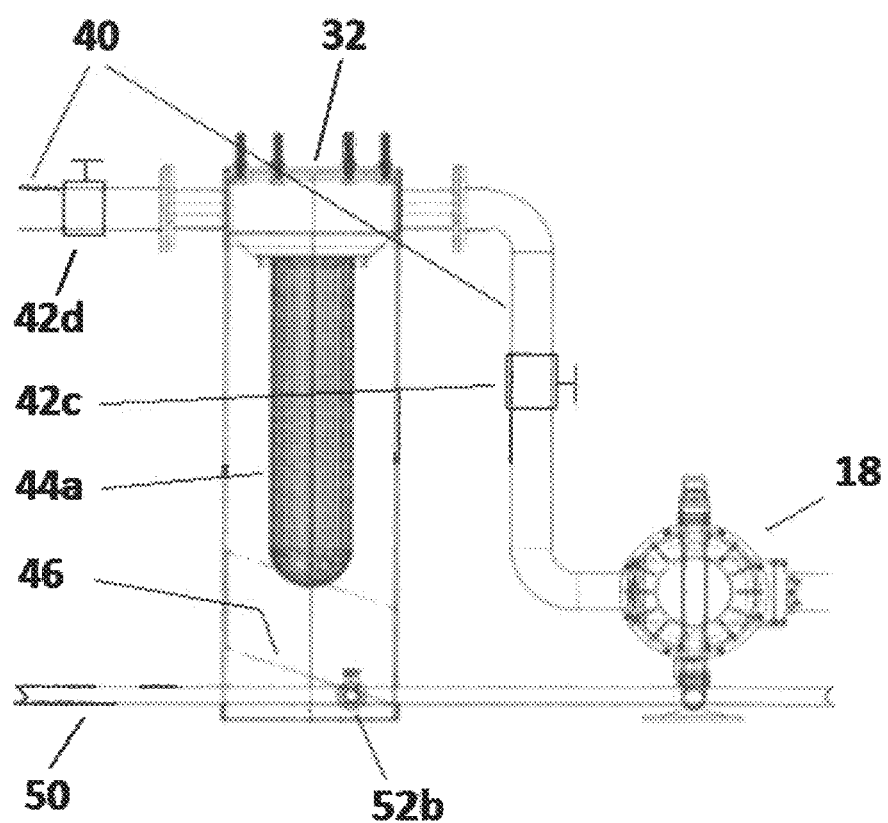

MULTI-PHASE STORAGE VESSEL CLEANING AND MAINTENANCE SYSTEM AND METHOD OF USE

TECHNICAL FIELD OF THE INVENTION

The present invention relates to the general field of industrial maintenance, specifically fuel tank filtration and cleaning, and more specifically, to cleaning and maintaining the fuel within fuel storage and similar type tanks.

BACKGROUND OF THE INVENTION

Storage tanks, particularly fuel storage tanks, are critical, and it is critical that they stay clean and maintained. Much fuel is provided to vehicles via underground fuel storage tanks, many of which are located at gas stations and other storage facilities. It is important that the fuel provided, such as diesel fuel or gasoline, stay at certain standards of purity to be useable.

Fuel storage tanks, with liquid product repeatedly filled in and pumped out, typically become contaminated, with contamination increasing overtime. Contamination is particularly problematic with tanks, such as underground petroleum dispensing tanks, which are frequently accessed to fuel vehicles and frequently re-filled. Fuel itself usually has some degree of contaminants. Contaminants can be of various substances, including heavier fuel components, soil, biological agents, and other non-product components—particularly underground as product is pumped in and out of the tank.

A frequent problem that can arise with underground tanks (or most any tank) is impurities or contaminants getting into the tank. The pipe or pipes for filling the tank—from the tank to the surface—provides an inlet for air. Each time a tank is opened in order to add fuel or remove it, there is an added opportunity for contaminants to get into the tank, from air or the ground near the tank. Moisture access into the tank can cause the moisture to condensate on the inside of the tank, adding water to the tank. Through this tank access pipe(s), additional foreign matter can also be introduced into the tank. In addition, the access of air into the tank provides a partially aerobic environment in which algae and other limited fungal or plant forms may grow within the tank, causing further contamination.

Further, each time fuel is removed, a small amount of contaminant is often left behind. In addition, after a number of fuel additions and removals from the tank, these contaminants tend to be left behind as a residue. These are typically heavier than the fuel component in the tank and "settle out" onto the bottom of the tank as a residual layer. Further, contaminants often accumulate together into larger accumulations—"lumps" and "chunks"—which become particularly difficult to remove. These contaminants can include, but are not limited to, deposits, dirt, and other matter that tend to collect at the bottom of the tank, rust from the tank, and impurities in the fuel itself. In addition, as the tanks are repeatedly opened, moisture can leak into a tank, or moisture contaminant in the fuel itself can condensate onto the tank walls. The opening of the tank, moisture in the tank, and environment can provide a chance for algae or other biological contaminants to grow within the tank, particularly on the walls of the tank.

After a sufficient buildup of contaminants, the fuel product, the storage facility itself, and any and all components used in the retrieval of fuel can become contaminated to the point that their quality and function are compromised. Too much contaminant can and does result in mechanical failure, resulting in expensive components, or even entire tanks or mechanical systems needing early and costly replacement. It can also result in, for example, inability to sell product to customers, profit loss from inferior fuel products, liability for customers, mechanical failure from consumption of compromised products, decline in revenue due to consumers' bad faith, shutdowns, and possible fines from various local, state, and federal agencies.

Accordingly, a tank requires occasional cleaning to clear these contaminants out and maintain the purity of the fuel, or other product, being stored in the tank. Currently, tanks are periodically cleaned and periodically inspected and tested. This is typically handled via a filtration and hose system.

FIG. 1 is an illustration of a typical set-up and method of use. Turning to FIG. 1, during a typical tank cleaning, an arrangement with a suction hose or line 1000 and one or more filters 1002 are shown. The suction hose or line 1000 is lowered into the tank 1004 at an access port 1006. The liquid in the tank 1008, and in the area of the suction hose is pumped out, collected and filtered with the one or more filters 1002. This collected fuel or other liquid can be replaced or filtered and recirculated back by a return line 1010. In addition, the fuel may also be chemically treated.

With current systems, the fuel directly around the access port and the fuel at the top of the tank may be somewhat effectively polished and filtered. Sediment and particulates directly in line with the access port(s) at the suction line tend to be removed. This, though, leads to a cleaning and treatment of the tank that is limited. This removal pattern tends to clean the fuel at the top of the tank and around the hose area. Because much matter is left in the tank, particularly at the bottom, it is necessary to frequently repeat the procedure to keep contaminants at bay enough for the fuel within the tank to remain usable.

Since the fuel away from the surface of the tank and/or the area away from the access port tends to be pulled into the suction pipe and cleaned less or not at all, fuel further away—"lumps" and clumps" and much of any sediment layer of contaminant particles at the bottom of the tank—are less likely to be cleaned, and therefore, more likely to be left behind to continue to contaminate any fuel or substance added to the tank. Further, algae particulates and other biological components, such as moisture, etc., can form on the entire surface area of the tank, such that most of the tank remains untouched and untreated. Because these methods and apparatus tend to maintain a level of contaminant rather than remove it, the result is a continuous need for service and cleaning of the tanks to hold the contaminant level down enough to keep the tanks serviceable. This results in a need for cleaning every six to twelve months, or possibly as little as every few months.

An additional problem in tank cleaning is the downtime. While a tank is being cleaned, it typically has to be shut down, taken offline, and removed from service. A tank cleaning, even a problematic one, typically lasts a number of hours, and can last days. This downtime is time the tank is not being used, which can cost, for example, a filling station, inconvenience, and a good deal of money.

What is needed is a system that provides an improved cleaning and maintenance solution, while increasing cleaning efficiency and decreasing downtime.

SUMMARY

A complete fuel tank maintenance and cleaning system is shown and described herein.

The tank cleaning system is generally comprised of a pressure cleaning head, a first tank outlet apparatus, a first inlet apparatus, a first pump and a second pump, at least one holding tank, and a series of filter cells. A storage tank is provided. In one embodiment, a first pump pulls the product in the tank from the tank via the end of the first outlet apparatus.

The removed product from the storage tank is filtrated through an initial filtration step, and then through a series of graduated filter cells until solid waste product above a pre-determined size is mostly or completely trapped in the array of filter cells and eliminated.

In one embodiment, the product first moves through a 600-micron filter cell as the initial filtration step, where larger contaminant particulates (above 600 microns) are filtered out. The product then moves through the first pump and into a second 300-micron filter.

After passing past the first pump, the product then continues to move through a series of smaller and smaller graduated filter cells. In an embodiment, the filter cell array is further comprised of a 200-micron filter cell, a 100-micron filter cell, and a 10-micron filter cell. Through this series of filters, a good amount of contaminant particulates is filtered out in a graduated manner.

The product is then pumped into at least one holding tank, or in other embodiments, a battery of holding tanks, for treatment. After the product enters the holding tank, the filtered product can undergo a number of treatments, such as water removal, or treatment with additional additives or to treat and clean the product.

After this phase, the product then travels via first inlet apparatus to be returned to the storage tank. At the end of the first inlet apparatus is at least one pressure cleaning head. As the product leaves the inlet apparatus through the pressure treating head, the pressure treating head focuses the fuel into a compressed spray or stream.

In one embodiment, the pressure treating head has an impeller capable of providing a rotating, and more powerful and focused motion, that directs the outgoing stream in a rotating motion. The higher-pressure fuel spray or stream from the pressure treating head is used to spray against the surfaces of the tank, providing a pressure washing to remove debris from the sides, top, and bottom of the tank, and the rotating movement of the head results in a pressure stream that works its way about the tank, cleaning the interior surfaces of the tank.

At least one pressure treating head is moved along and through the tank, a section at a time, until the tank interior is cleaned. The focused stream also blasts the surfaces of the tank so that any treatment agents added to the fuel are distributed onto the surfaces of the tank. Biological contaminants growing on the surfaces can thereby be eliminated.

The high-pressure rotating jet stream, in addition to cleaning the sides of the tank, can break up and clean any sediment layer at the bottom of the tank, including any larger accumulations of contaminant—such as chunks or clumps of sludge—so they can be suctioned from the storage tank via the first outlet apparatus and filtered out. This removes most or all bottom particulates that have settled.

Further, the action of the pressure head provides circulation of the product such that between the breaking down of sediment and contaminant pieces, and increased circulation of the product, the product is eventually circulated through the filtration and cleaning system.

As the product is circulated and possibly recirculated, through the cycle of outlet apparatus and filter cells, the increasingly cleaned product is added back into the tank via the inlet apparatus. The processed product from the tank can be continuously polished for a thorough cleaning. The product can be circulated, and recirculated as many times as necessary, until the fuel is cleaned to the extent desired.

In an embodiment, a primary cell line moves the product through the filter cells, then to the holding tank. The outlet apparatus is comprised of any apparatus suitable to store a line with the system and move it, when need be, into the storage tank.

By this method, the interior surface of the tank is completely cleaned. Rather than removing some fuel around the area of inlet and cleaning only that portion, the inventive system and method herein cleans, maintains, and provides ongoing protection from the elements and future contaminants to the entire tank, including the removal of accumulated bottom deposits.

In an embodiment, a drainage line for drainage moves along near the bottom, or near the bottom of the cells. One end of the drainage line is connected to the holding tank at or near its bottom and the other end is a secondary inlet apparatus capable of placement within the storage tank. Water and/or waste can be drained from the holding tank and any or all of the filter cells to the secondary inlet apparatus to be placed back into the storage tank for further treatment, or into another tank for removal or treatment. With various arrangements of valves, any specific filter cell, more than one, or even all of them, can be drained or isolated from the drainage process. The holding tank can likewise be added or included in drainage.

In further embodiments, the filter cells have varying filtration apparatus to meet the finer and finer filtration needs as the product proceeds through the system, such as, e.g., a basket and filter bag insert, pleated filtration bags, fuel filtration cartridges, or combination of these.

An inclined internal ramp can be provided and positioned within each filter cell such that the presence of the inclined internal ramp creates a non-level surface, front to back and side to side, that facilitates any waste chunks or particles sliding down the surface and into the drainage line.

In a further embodiment, a set of secondary filter cells are provided, and a secondary filter bypass line connects to the primary filter cell line, and along the secondary filter cells. Additionally, a set of secondary cell bypass valves are provided, so that the secondary filter cells can be added for increased filtration capacity, taken off line, or substitutes for the primary filter cells. Drainage of the secondary cells is provided by a secondary drainage line that runs along the cells emptying into the primary drainage line.

In a further embodiment, some or all of the drainage in the drainage line can be diverted from the secondary tank inlet apparatus (and back into the storage tank) and into the waste treatment/removal sub-system, via a waste a removal/treatment line branching from the drainage line. The diverted drainage can be pumped by a waste removal pump and into an additional filtration cell for extra filtration, possibly extra treatments, and possibly back into the storage tank.

Alternatively, some or all the drainage can be diverted into a waste removal line and collected by a waste removal tank.

In a further embodiment, a mobile power and support sub-system can be added. The mobile support sub-system is comprised of a power unit, any hydraulic apparatus for supplying hydraulic power to components, and apparatus for supplying compressed air to any air-powered apparatus. A flow control valve can further be controlled from the power unit to control the speed and activity of the pressure cleaning head.

In a further embodiment, a station bypass sub-system for maintaining continuous operation of the storage tank is provided. The station bypass sub-system is comprised of a station bypass supply apparatus, a bypass pump, and in an embodiment, an electronic line or apparatus between a station (such as a fuel station) and the bypass pump for providing electronic communication between the station and bypass pump.

The station bypass supply apparatus serves to connect the bypass supply pump to the dispenser set. The bypass pump is powered, bypassing a submersible pump in the storage tank, providing a temporary substitute and maintaining a functioning pump and the set of dispensers, Pressure can be maintained, minimizing downtime of the storage tank for cleaning.

In a further embodiment, the system can be placed in, and operated from, a mobile system such as a large truck in which, for example, the holding tank and remaining filtration components are contained within the mobile system.

In a further embodiment, valves can be arranged such that the holding tank can be isolated from the system, a secondary tank brought online, and soapy water or other suitable or alternate cleaning fluids can be pumped and circulated from the secondary cleaning tank and through the system. The soapy water or other cleaning fluid can be used to provide a stream from the pressure cleaning head, providing further cleaning to the inner surface of the storage tank.

Shown and described is a system and method for not simply maintaining a storage tank, but of emptying the entire storage tank of its product and providing a complete and thorough cleaning of the tank, as well as providing protective maintenance of the complete inner surface of the storage tank, thereby lengthening the amount of time between cleanings and increasing the useful life of the storage tank. The system also provides a more efficient cleaning process with less costly downtime for the storage tank.

BRIEF DESCRIPTION OF THE DRAWINGS

FIG. 4 is a side view schematic diagram featuring a particular aspect of the embodiment of FIG. 3.

DETAILED DESCRIPTION OF PREFERRED EMBODIMENTS

Figure 1:
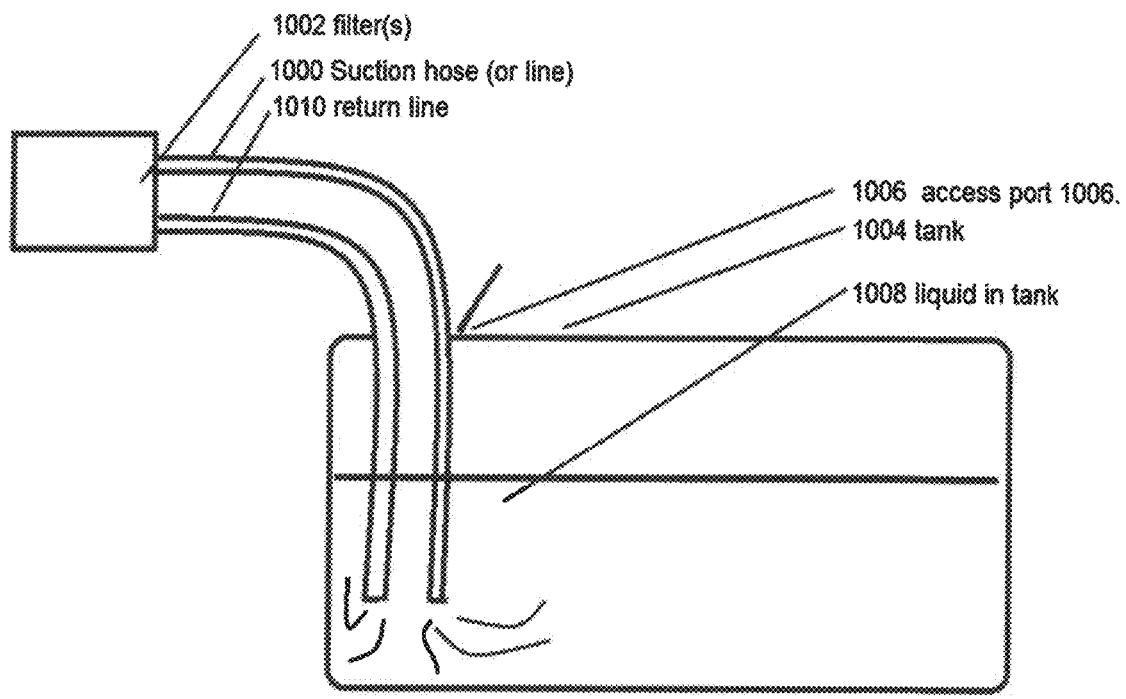
FIG. 1 is a schematic diagram of an embodiment representing comparative Prior Art.
Figure 2:
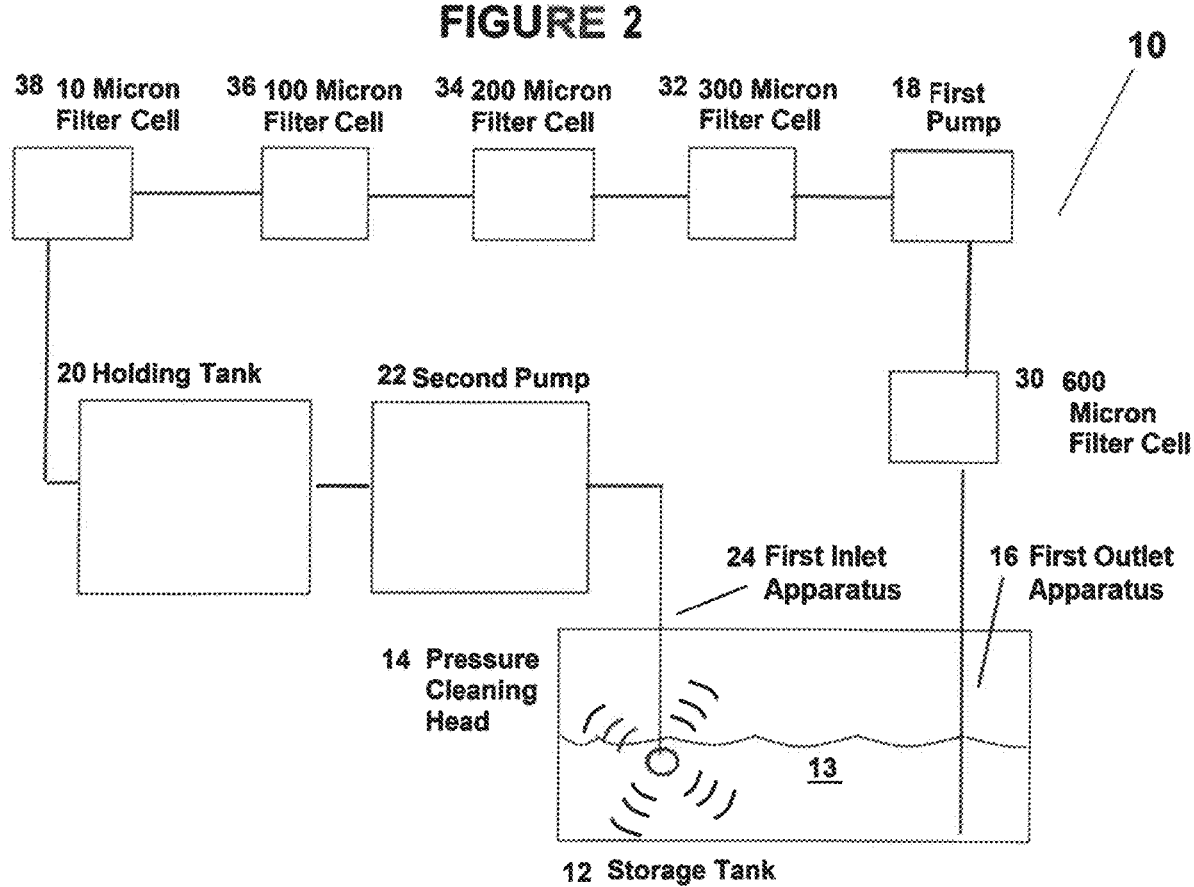
FIG. 2 is a schematic flow diagram of an embodiment of the invention herein with basic steps shown.

Turning to FIG. 2, a basic embodiment showing some core components of a complete fuel tank maintenance and cleaning system ("tank cleaning system") 10 is shown.

The invention shown and described herein addresses the issues related to insufficient tank cleaning with a system that cycles and cleans all of the fuel in the tank and provides protection against biological contaminants. As will be seen, the apparatus and method herein are capable of effectively cleaning underground storage tanks and aboveground storage tanks (UST & AST). The system implements a multi-stage filter system to effectively remove contaminants from tanks by filtering the stored product and using the product as a streamed cleaning agent, or in some embodiments, using an alternative fluid as a cleaning agent.

Other objects, features, and advantages of the invention will become apparent from a consideration of the following detailed description and the accompanying drawings. The following descriptions are made referring to the figures, wherein like reference number refers to like features throughout this description. It is to be understood some features may not be visible in some figures.

The tank cleaning system 10 is generally comprised of a pressure cleaning head 14, a first tank outlet apparatus 16, a first inlet apparatus 24, a first pump and a second pump 18, 22, at least one holding tank 20, and a series of filter cells 30, 32, 34, 36, 38.

A storage tank 12 is provided. The tank can be of any type used for storage and in need of occasional cleaning including, but not limited to, agricultural, chemical, crude oil, or other fuels. In this embodiment, and for illustrative purposes, the storage tank 12 is an underground light petroleum tank—which can store petroleum fuel products such as (but not limited to) diesel, off-road diesel, kerosene, or gasoline blends of the type found at a typical filling station. A first pump 18 pulls the product 13 in the tank from the tank 12 via the end of a first outlet apparatus 16. The first pump can be any suitable in the art, and in this embodiment, is a diaphragm pump. It is to be understood that product 13 refers to the product in the tank to be cleaned, and for illustrative purposes, the product 13 will be a fuel and referred to as such.

For clarification, an apparatus (such as hoses, reels, lines, etc.) that removes product from the storage tank 12 will be called "outlet" apparatus and apparatus that moves fuel 13 back into the storage tank 12 will be called "inlet" apparatus.

The removed fuel 13 from the storage tank 12 is filtrated through an initial filtration step, and then through a series of graduated filter cells 30, 32, 34, 36, 38 until solid waste product above a pre-determined size is mostly or completely trapped in the array of filter cells and eliminated.

In this embodiment, the fuel first moves through a 600-micron filter cell 30 as the initial filtration step, where larger contaminant particulates (above 600 microns) are filtered out. The fuel then moves through the first pump 18 and into a second filter 32, in this embodiment a 300-micron filter.

In this embodiment, it is arranged such that the largest waste particles are cleared before the fuel moves through the first pump 18, but the filter cells 30, 32, 34, 36, 38 and pumps can be arranged in any suitable fashion for this objective. Further, the number of fuel cells and pumps is one possible embodiment, but these numbers can vary depending on factors such as space limitations, task to be completed, and time available.

After passing past the first pump 18, the fuel then continues to move through a series of smaller and smaller graduated filter cells 32, 34, 36, 38; in this embodiment the filter cell array is further comprised of a 200-micron filter, a 100-micron filter, and a 10-micron filter cell. Through this series of filters, a good amount of contaminant particulates is filtered out in a graduated manner.

The sizes of graduated filters can vary and be of any arrangement suitable for a specific cleaning purpose. Sizes used can depend upon such factors as type of fuel 13 in the storage tank 12, condition of the product 13, and type and amount of waste present. The specific type of filters can be adjusted as needed to perform the task required. For example, a fuel with larger contaminant particles might have more large-micron filters, whereas a fuel concentrated with smaller contaminants might focus more on low-micron filters.

The fuel is then pumped into at least one holding tank 20, as in this embodiment, or battery of holding tanks, for treatment. In this embodiment, there is a single holding tank 20.

After the fuel enters the holding tank 20, the filtered fuel can undergo a number of treatments.

Water that may have accumulated in the storage tank 12 can be removed. Further, the fuel may be treated with additional additives or treatments while in the holding tank 20 to treat and clean the fuel.

For example, at least one additive can be added to the fuel as it is run through the tank 20 to kill any biological matter in the fuel, such as algae or fungi. The fuel may also be treated with an added biocide to provide preventative algae-killing cleaning and/or fungi killing of the interior of the tank 12 to prevent fuel breakdown.

The type and number of treatments can vary, depending upon such factors of contaminants present in the fuel, type of fuel, and local climate. While in this embodiment such cleaning, additive, and removal is done in a single tank 20, it can be done with a battery of two or more tanks with specialized functions.

After this phase, the fuel is eventually pulled from the holding tank 20 via a second pump 22, and onward. The fuel then travels via first inlet apparatus 24 to be returned to the tank 12.

At the end of the first inlet apparatus 24 is at least one pressure cleaning head 14. As the fuel leaves the inlet apparatus 24 through the pressure treating head 14, the pressure treating head 14, because of its configuration, focuses the fuel into a compressed spray or stream ("stream"). The pressure treating head 14 is of a type suitable in the art for its purpose. The pressure treating head 14, in this embodiment, has an impeller capable of providing a rotating, and more powerful and focused motion, that directs the outgoing stream in a rotating motion. The higher-pressure fuel spray or stream from the pressure treating head 14 is used to spray against the surfaces of the tank 12, providing a pressure washing to remove debris from the sides, top, and bottom of the tank 12, and the rotating movement of the head results in a pressure stream that works its way about the tank 12, cleaning the interior surfaces of the tank 12.

At least one pressure treating head 14 is moved along and through the tank 12, a section at a time, until the tank 12 interior is completely cleaned. The focused stream also blasts the surfaces of the tank 12 so that any treatment agents added to the fuel are distributed onto the surfaces of the tank 12. Biological contaminants, such as algae or fungi, growing on the surfaces, can thereby be eliminated.

The high-pressure rotating jet stream, in addition to cleaning the sides of the tank, can break up and clean any sediment layer at the bottom of the tank, including any larger accumulations of contaminant—such as chunks or clumps of sludge—so they can be suctioned from the tank 12 via the first outlet apparatus 16 and filtered out. This removes most or all bottom particulates that have settled.

Further, the action of the pressure head 14 provides circulation of the fuel 13. Between the breaking down of sediment and contaminant pieces, and increased circulation of the fuel, the fuel is eventually substantially or completely circulated through the filtration and cleaning system 10.

This system 10 also provides filtration, moisture removal, and elimination of algae or other biological accumulation. As the fuel 13 is circulated and possibly recirculated, through the cycle of outlet apparatus 16 filter cells 30, 32, 34, 36, 38, the increasingly cleaned fuel is added back into the tank 12 via the inlet apparatus 24. The processed fuel 13 from the tank 12 can be continuously polished for a thorough cleaning. The fuel 13 can be circulated, and recirculated, with the cleaning method and apparatus applied as many times as necessary, until the fuel is cleaned to the extent desired. In this embodiment, the process is repeated for 4-12 hours until all the fuel in the tank is cleaned and treated.

It is noted that the tank cleaning system 10 can be comprised of more than one pressure head 14 and more than one high pressure stream, as appropriate for completing the task. This configuration using at least one pressure cleaning head 14 improves upon typical vacuum system, commonly found in the art, in several respects.

By this method, the interior surface of the tank 12 is completely cleaned. Rather than removing some fuel around the area of inlet and cleaning only that portion, the inventive system and method herein cleans, maintains, and provides ongoing protection from the elements and future contaminants to the entire tank 12, including the removal of accumulated bottom deposits.

Rather than a tank needing to be re-cleaned about every six months, as is common in the art, this method and apparatus typically provide cleaning that lasts from 5 years up to ten years. The system, by removing bio-contaminants and sediments, also increases the useful lifetime of the storage tank itself.

Figure 3:
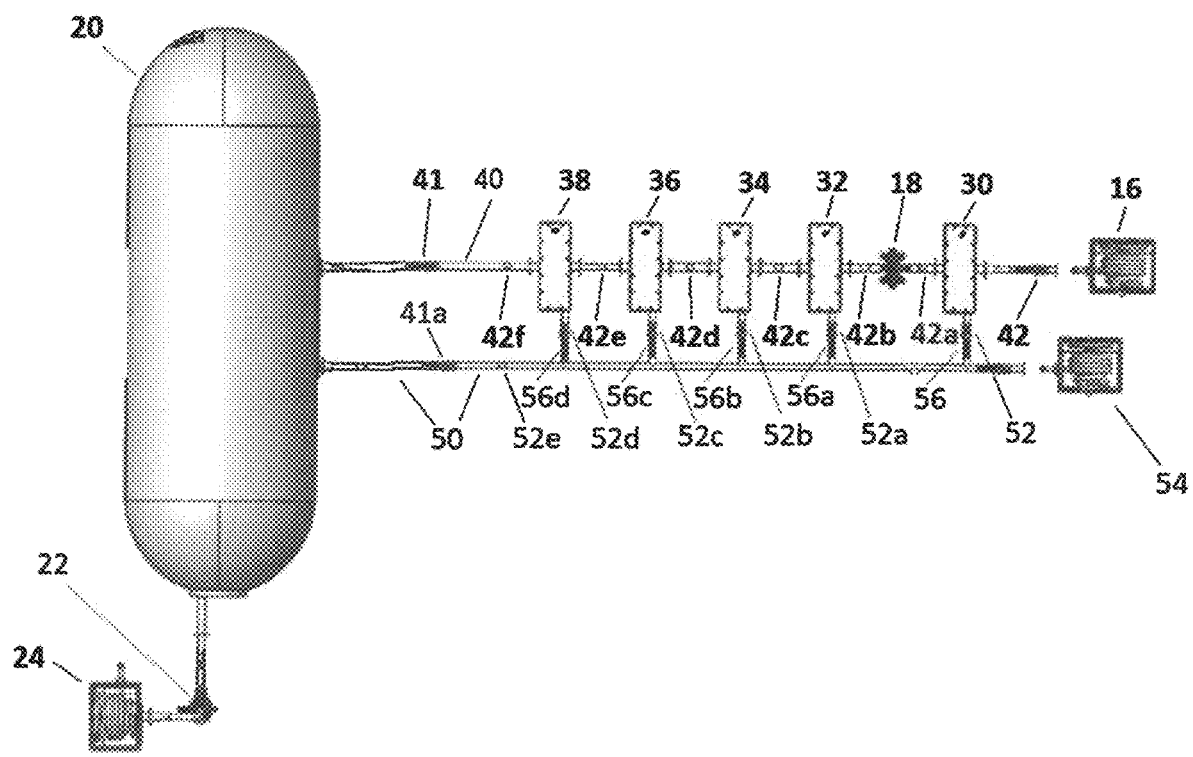
FIG. 3 is a top plan view schematic diagram of the embodiment of FIG. 2 with additional apparatus components shown.

Turning to FIG. 3, a further embodiment of the invention of FIG. 2 is presented, with more detailed apparatus and a fuel cell drainage system shown. A primary cell line 40 moves the fuel through the first pump 18, through the filter cells 30, 32, 34, 36, 38, then to the holding tank 20. The outlet apparatus 16 is comprised of any apparatus suitable to store a line with the system 10 and move it, when need be, into the storage tank 12. In this embodiment, the inlet apparatus, other inlet, and outlet apparatus are generally comprised of a retractable hose and reel arrangement. The hose(s) and lines herein can be any suitable size, and in this embodiment, the lines/hoses of the inlet apparatus and the outlet apparatus are about 2".

In this embodiment, a drainage line 50 for drainage moves along near the bottom, or near the bottom of the cells 30, 32, 34, 36, 38. One end of the drainage line 50 is connected to the holding tank 20 at or near its bottom and the other end is a secondary inlet apparatus 54 capable of placement within the tank. Further, a set of cell drainage lines 56, 56a, 56b, 56c, 56d connects the filter cells 30, 32, 34, 36, 38 to the drainage line 50. In this embodiment, the drainage lines 50, 56, 56*a*, 56*b*, 56*c*, 56*d*** are 1¼.

Also present in this embodiment are two sets of valves: a set of cell bypass valves 42, 42*a*, 42*b*, 42*c*, 42*d*, 42*e*, 42*f*, along the primary cell line 40 between components and a set of drainage valves 52, 52*a*, 52*b* 52*c*, 52*d*, 52*e*, located along and between the respective cell drainage lines 56, 56*a*, 56*b*, 56*c*, 56*d*.

These respective valves are positioned along the lines such that the water and/or waste can be drained from the holding tank 20 and any or all of the filter cells 30, 32, 34, 36, 38, to the secondary inlet apparatus to be placed back into the storage tank 12 for further treatment, or into another tank for removal or treatment. With the arrangement of valves, any specific filter cell, more than one, or even all of them, can be drained or isolated from the drainage process. The holding tank 20 can likewise be added or included in drainage.

Here, the process and apparatus may take advantage of the differing densities of water and fuel. Water is heavier than fuel, and given sufficient time, water mixed in the fuel will settle to the bottom of the holding tank 20 and possibly one or more filter cells. In addition, any larger waste contaminant particles remaining are also likely to settle to the bottom of the holding tank 20, one or more filter cells 30, 32, 34, 36, 38, or both. In either case, positioning the drainage line 50 and cell drainage lines 56, 56*a*, 56*b*, 56*c*, 56*d* at or near the bottom of the holding tank 20 and cells 30, 32, 34, 36, 38** can aid in removal of these from the fuel.

It is noted that, though in this embodiment the holding tank 20 and filter cells 30, 32, 34, 36, 38 are drained by the same line, the system can be set up so that they can be drained, and their product moved, separately.

Further, a pair of respective level sensors 41, 41*a* are located along the main filter cell line 40 and drainage line 50** for monitoring the water flow and level in these lines. This can also be done by any means in the art such as, with sensors and automatic valves, or as in this embodiment, sight glass and ball valves.

Figure 3A:
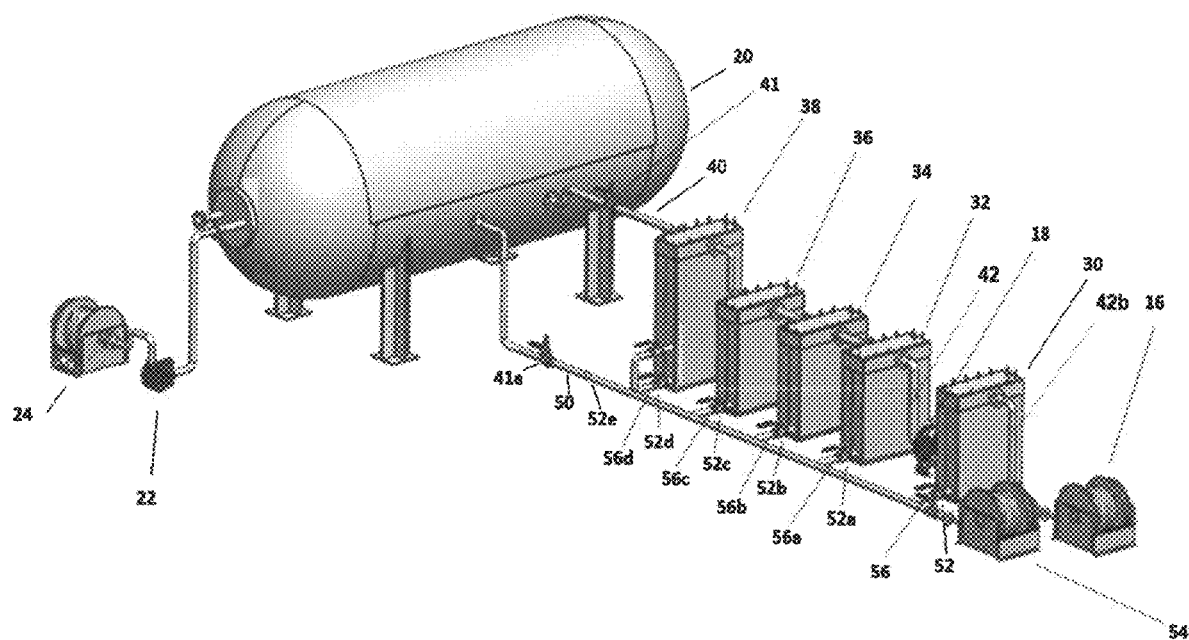
FIG. 3A is a schematic perspective view of the embodiment of FIG. 3.

Turning to FIG. 3A, this embodiment is shown in a perspective view for added clarity.

Turning briefly to FIG. 4, a representative filter cell 32 is shown with a side removed to show the interior for further discussion of a couple of possible additional features of a filter cell. The filtration system within each cell can be any appropriate in the art for the filtration task. In this embodiment, the cells have varying filtration apparatus to meet the finer and finer filtration needs as the fuel proceeds through the system. The filtration for most of the cells herein 30, 32, 34, 36 is comprised of a set of bag filtration units, one of which, 44, is visible in this figure. This representative bag filtration unit 44 is comprised of a basket and filter bag insert as known in the filtration art. The basket insert is placed in the bag of the filtration unit 44, and after sufficient use, can be removed and replaced. The bags or filtration system can be altered to suit specific filtration criteria. In this embodiment, ordinary bag inserts as in the art are used for cells 30, 32, and pleated filtration bags are used for cells 34, 36 to meet the finer filtration needs.

Figure 4A:
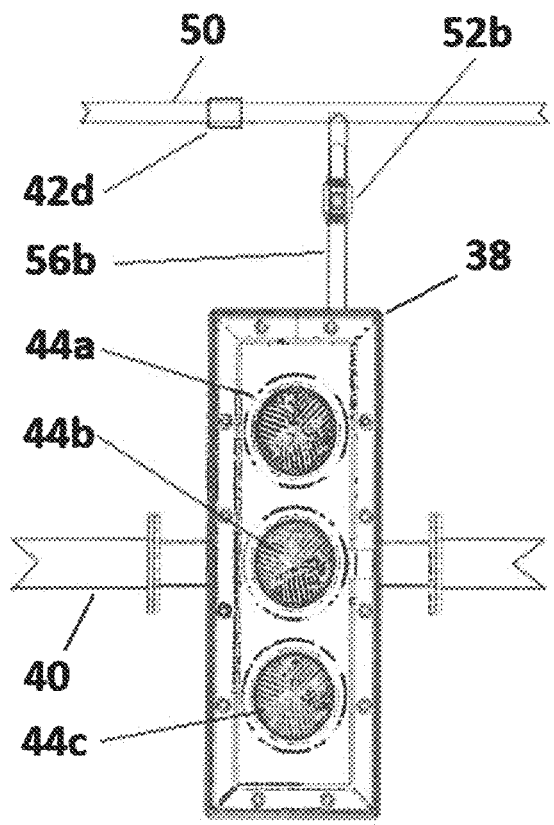
FIG. 4a is a top plan view schematic diagram of the aspect shown in FIG. 4.

Turning to FIG. 4*a*, as can be seen, multiple filtration units, represented here as 44, 44*a*, 44*b*, are shown used in this cell 32 to increase the capacity of the cell 32 (or any cell).

Figure 4B:
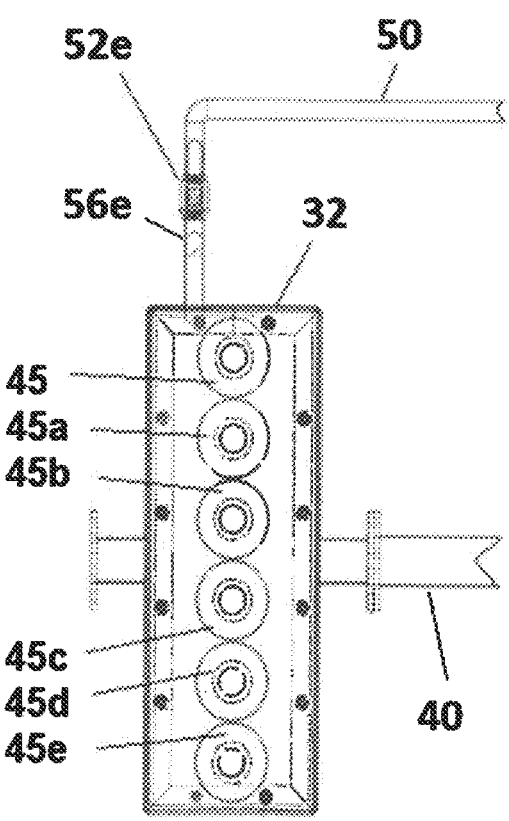
FIG. 4b is a top plan view schematic diagram featuring another particular aspect of the embodiment of FIG. 3.

Turning to FIG. 4*b*, fuel filtration cartridges 45, 45*a*, 45*b*, 45*c*, 45*d*, 45*e* are shown used with the final cell 38 to meet the final filtration needs of that final cell. The cartridges can be installed, and when used, removed and replaced.

Returning to FIG. 4, at the bottom of the filter cell 32, an inclined internal ramp 46 has been provided, and as can be seen, it is positioned such that the bottom is at about the level of the drainage line 56*a* for that cell. The presence of the inclined internal ramp creates a non-level surface, front to back and side to side, that facilitates any waste chunks or particles sliding down the surface and into the drainage line 56*a* than simply accumulating at the bottom of the filter cell 32.

Figure 5:
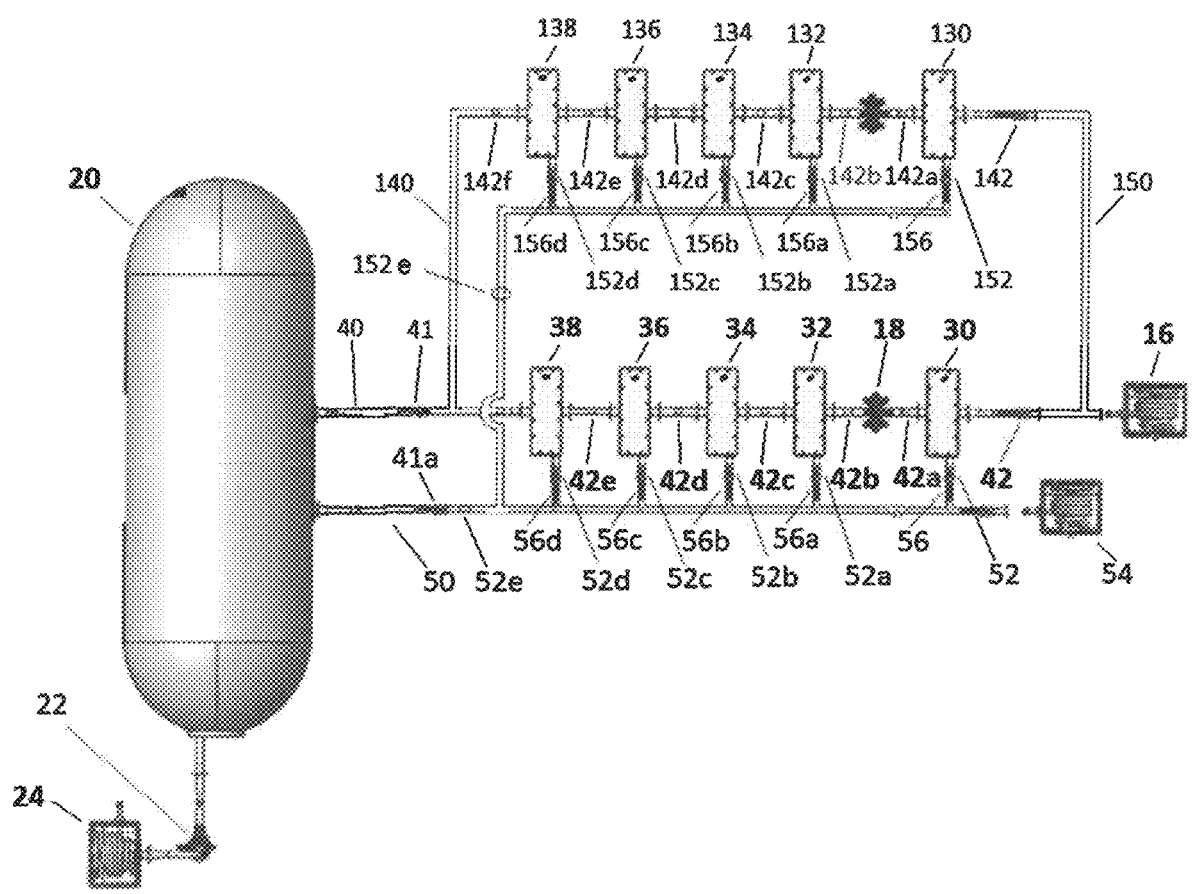
FIG. 5 is a top plan view of an alternative embodiment of the invention featuring additional components.

Turning to FIG. 5, an embodiment with a set of secondary filter cells 130, 132, 134, 136, 138 is shown. As previously mentioned, the arrangement and number of filter cells, pumps, and lines can be adjusted to meet specific needs and circumstances. In this embodiment, a set of secondary filter cells 130, 132, 134, 136, 138 is also shown.

A secondary filter bypass line 140 connects to the primary filter cell line 40 on either side of the primary filter cells 30, 32, 34, 36, 38, traveling around them, and along the secondary filter cells 130, 132, 134, 136, 138.

Additionally, a set of secondary cell bypass valves 142, 142*a*, 142*b* 142*c*, 142*d*, 142*e*, 142*f* are positioned along the secondary fuel filter line 140, between and outside the secondary filter cells 130, 132, 134, 136, 138.

Drainage of the secondary cells 130, 132, 134, 136, 138 is provided by a secondary drainage line 150 that runs along the cells 130, 132, 134, 136, 138, emptying into the primary drainage line 50. Secondary cell drainage lines 156, 156*a*, 156*b*, 156*c*, 156*d* connect the respective cells 130, 132, 134, 136, 138 to the secondary drainage line 150. A set of cell drainage valves 152, 152*a*, 152*b* 152*c*, 152*d*, 152*e* enable drainage from each respective cell, and the secondary drainage line 50**, to either flow or be cut off.

This arrangement of secondary cells and valves enables a user to either activate or shut the valves 142, 142*f* on either side of the cells 130, 132, 134, 136, 138 enabling the secondary filter cells to be included with, or cut off from, the system. In this system, either primary 30, 32, 34, 36, 38 or secondary filter cell 130, 132, 134, 136, 138 lines can be cut off from the system for maintenance, repair, or simply to take it off line, while the system 10** keeps operating with the remaining filter cell line.

In addition, the system can operate both lines at once for increased filtration capacity. Further, additional lines and valves can be provided around each filter cell to enable bypass of a specific filter cell for maintenance, repair, etc. Further, additional or alternative filter cell arrangements can be added in further embodiments to achieve specific goals or purposes.

Figure 6:
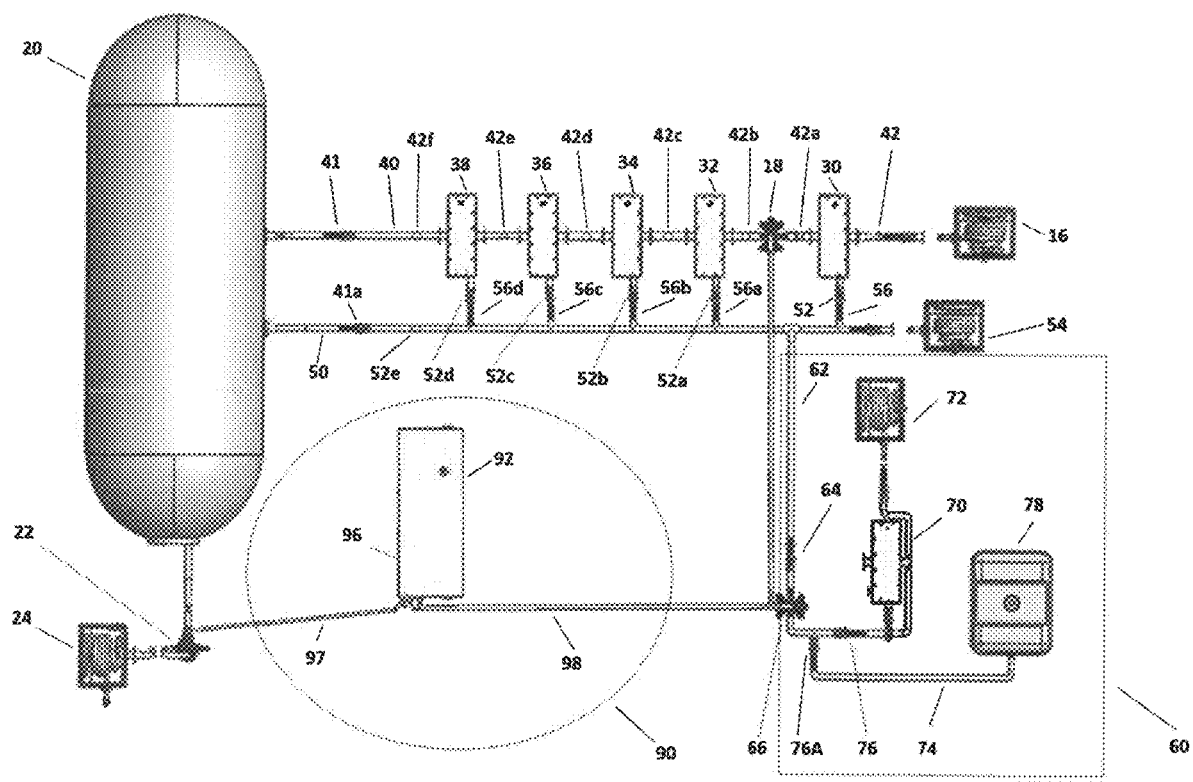
FIG. 6 is a top plan view of an alternative embodiment of the invention featuring additional components.

Turning to FIG. 6, a further embodiment featuring embodiments of an additional waste treatment and removal sub-system, and mobile power and support sub-system.

Water and bottom tank waste from the holding tank can, as mentioned, be drained via the secondary tank inlet apparatus 54, and this option is still present. Either additionally or alternatively to this, some or all of the drainage can be taken via an additional waste treatment/removal sub-system 60. The additional waste treatment/removal sub-system 60 can be comprised, first, of an additional waste removal/treatment line 62 branching from the drainage line 50, a waste removal line 74, and a pair of waste removal valves 76, 76*a* on the waste removal/treatment line 62 and waste removal line 74, respectively. By operating these, some or all of the drainage can be diverted from the secondary tank inlet apparatus 54 (and back into the storage tank 12) and/or into the waste treatment/removal sub-system 60. The drainage can be pumped by a waste removal pump (in this embodiment a diaphragm compressor pump) 66** and into an additional filtration cell 70. Here, extra filtration, and possibly extra treatments, can be provided and the additionally treated fuel pumped back into the storage tank 12 via an additional tank input apparatus 72. When, or if, this step is no longer needed, the waste removal valve 64 can be turned to isolate this sub-system 60 out of the process.

Alternatively, for example, if the drainage has a high-water content, it would be better to remove; a waste removal line 74 branching from the waste removal/treatment line 62 is provided and a pair of waste removal line valves 76, 76a, located on the waste removal/treatment line 62 and the waste removal line 74, respectively, can be activated to divert drainage into the waste removal line 74. This drainage waste can be collected by a waste removal tank. When the undesirable portion is removed or the tank 78 is full, the valves 76, 76a can be turned to isolate the waste removal tank 78 from the sub-system 60.

Moving to another enhancement of this embodiment or alternative embodiment, a mobile power and support sub-system 90 can be added. In an embodiment, hydraulic, power, and compressed air to operate the system can be supplied by non-mobile apparatus on site.

In this embodiment, however, the mobile support sub-system 90 is provided. It is comprised of a power unit 92, which can be powered by engine, battery, or other means known in the art, that supplies any necessary electrical power to the system. Also present at the power unit 92 is any hydraulic apparatus 96, such as tank and/or motor, for supplying hydraulic power to components. Hydraulic line(s) 97 can extend as needed to operate any apparatus, such as in this embodiment to the second pump 22, which in this embodiment is a sliding vein type pump and a flow control valve 94, respectively. At least one airline 98 can extend from the power unit 92 to any air-powered apparatus. In this embodiment, air is supplied via airline(s) 98 to the first pump 18 and waste removal pump 66 (which in these embodiments, are diaphragm compressor type pumps).

The flow control valve 94 can be controlled from the power unit 92 or other ways known in the art (such as remotely or wirelessly). The amount of flow through the line and to the pressure cleaning head 14 can be controlled via the flow control valve, to adjust the speed and activity of the pressure cleaning head 14.

Figure 7:
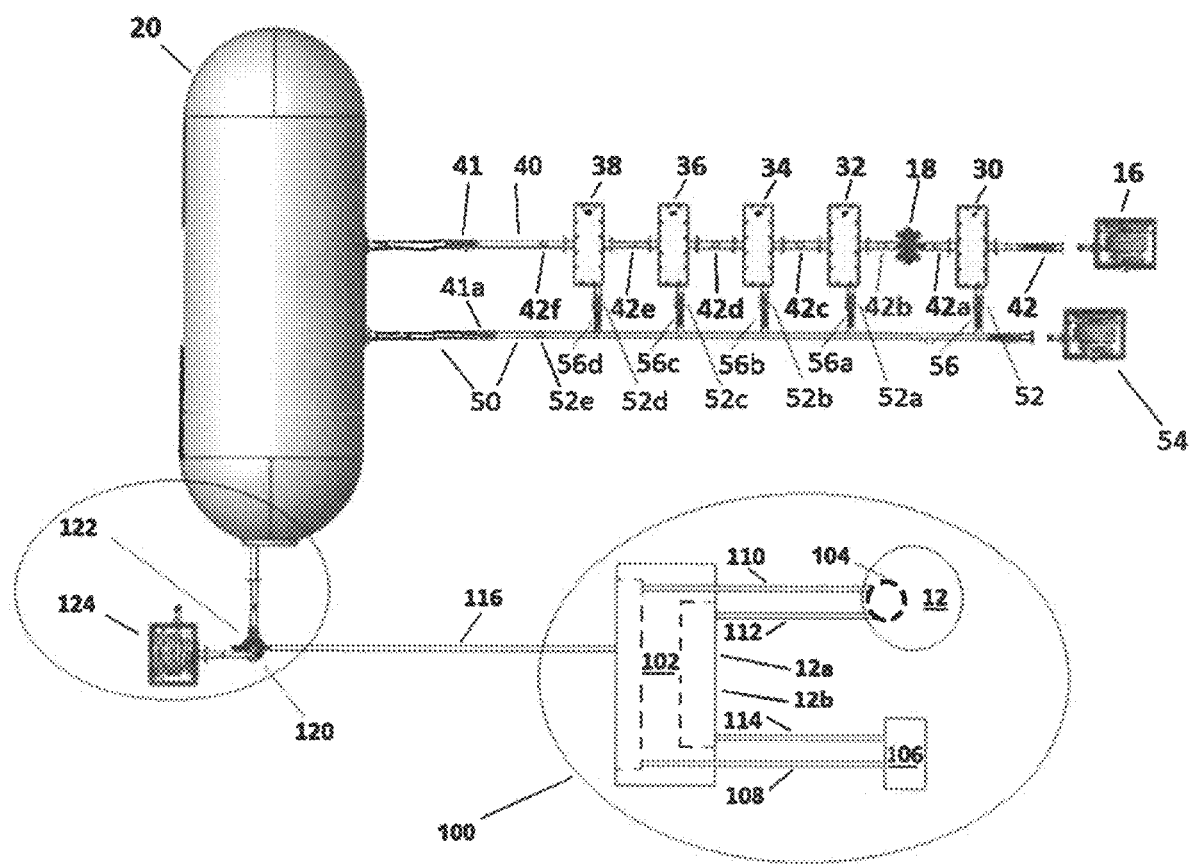
FIG. 7 is a top plan view of an alternative embodiment of the invention featuring additional components.

Turning to FIG. 7, a further embodiment is featured, showing an additional apparatus and steps for maintaining continuous operation of the storage tank 12.

In a typical operation of a dispensing center, such as a gas station, the station pumping control system 100 would be as follows. A station 102 with a power supply and electronic control will be provided. A set of one or more dispensers (known colloquially as "gas pumps") 106 is typically powered via power line 108 from the station 102, and a submersible pump 104 within the storage tank 12 is also powered via a power line 110 from the station 102.

In a typical example of use, a customer would pull a vehicle up to the dispenser set 106. The customer will then make a purchase at the dispenser set 106, or go inside the station 102 and do so. In either event, one of the dispensers 106 will notify the station 106 system electronically, or vice versa, depending on where the purchase was made, and purchase data will be transmitted via electronic line 114 between station 102 and dispenser set 106. The station 102 will then electronically inform the submersible pump 104 via electronic line 114, which will activate the pump. In other embodiments, these interactions involving electronic lines can be conducted wirelessly. The notification activates the pump 104 to supply a pre-determined amount of fuel to the dispenser set 106 based on amount of fuel purchased.

When the system is in use, however, shutting down the submersible pump 104 is typically necessary for safety or practical reasons. This takes the storage tank 12 offline and can make a cleaning of the storage tank 12 very inefficient and costly to station operation. However, the station bypass operating sub-system 120 can solve this issue.

The station bypass sub-system 120 is comprised of a station bypass supply apparatus 122, a bypass pump 124, and in this embodiment, an electronic line 116 between the station 102 and the bypass pump 124. The power unit 92 is connected to the bypass pump 124 and powers it. Basically, the sub-system 120 bypasses the submersible pump 104 and lines from the tank 12, which are non-operational, providing a temporary substitute and maintaining operation of a pump and the dispensing set 106.

The station bypass supply apparatus 122 serves to connect the bypass supply pump to the dispenser set 106, and an electronic control line 116 is run from the apparatus controlling the station 102 to the bypass pump 124. The submersible pump 104 in the tank 12 is shut off, bypassing the power supply to the pump 104, as well as the electronic line 112 controlling it, and power supply line 110 powering the pump 104.

As an example of use, when user orders a set amount of fuel at either the dispenser unit 106 or station 102, this information is transmitted from the point of sale via the bypass electronic transmission line(s) 116 to the bypass pump 124, activating the bypass pump 124, and bypassing the electronic control line 112 from the station 102 to the submersible pump 104. The power unit 92 powers the bypass pump 124. The bypass pump 124, having been given a command via electronic control line 116 to dispense a specific amount of fuel, supplies this amount of fuel from the holding tank 20 (rather than from the storage tank 12) to the dispenser set 106 via the station bypass supply apparatus 122, which is as previously described for other inlet and outlet apparatus. Fuel is supplied to the dispenser set 106 long enough to supply the necessary fuel.

It is noted that the connections from the bypass pump 124, via the bypass supply apparatus 122 to the dispenser set 106, are provided with apparatus known in the art for preventions fire, shock, or explosion, increasing the safety of the station bypass operating sub system 120.

This use of this station bypass operating sub-system 120 minimizes the downtime of the tank 12 for cleaning. The main power to the submersible pump 104 within the tank 12 is shut down for a brief set-up time. During this time, the submersible pump 104 itself may even be removed and cleaned. When the overall cleaning process is completed, there is a brief downtime while the system 10 is disconnected, and the submersible pump 104 restored to its main power source. By this method, pressure can be maintained, and the tank 12 kept usable, through most of the process except for these brief set-up and take-down times. This results in minimal lost down time instead of the hours or days of down time of a tank typically required.

It is noted that in an alternative embodiment, an alternative tank can be used, along with the bypass pump 124 and then connected to the dispensers 106 to maintain service through the process.

It is noted that there is often more than one storage tank 12 at a filling station or other location. Often, filling stations will have at least three storage tanks: a regular gasoline tank, a premium gasoline tank, and a diesel tank. Here, the additional tanks are represented as 12a, 12b. These and any other tanks can also be connected to the system 10 and operated as shown for tank 12, though for clarity, these additional connections are not shown in this figure.

Figure 8:
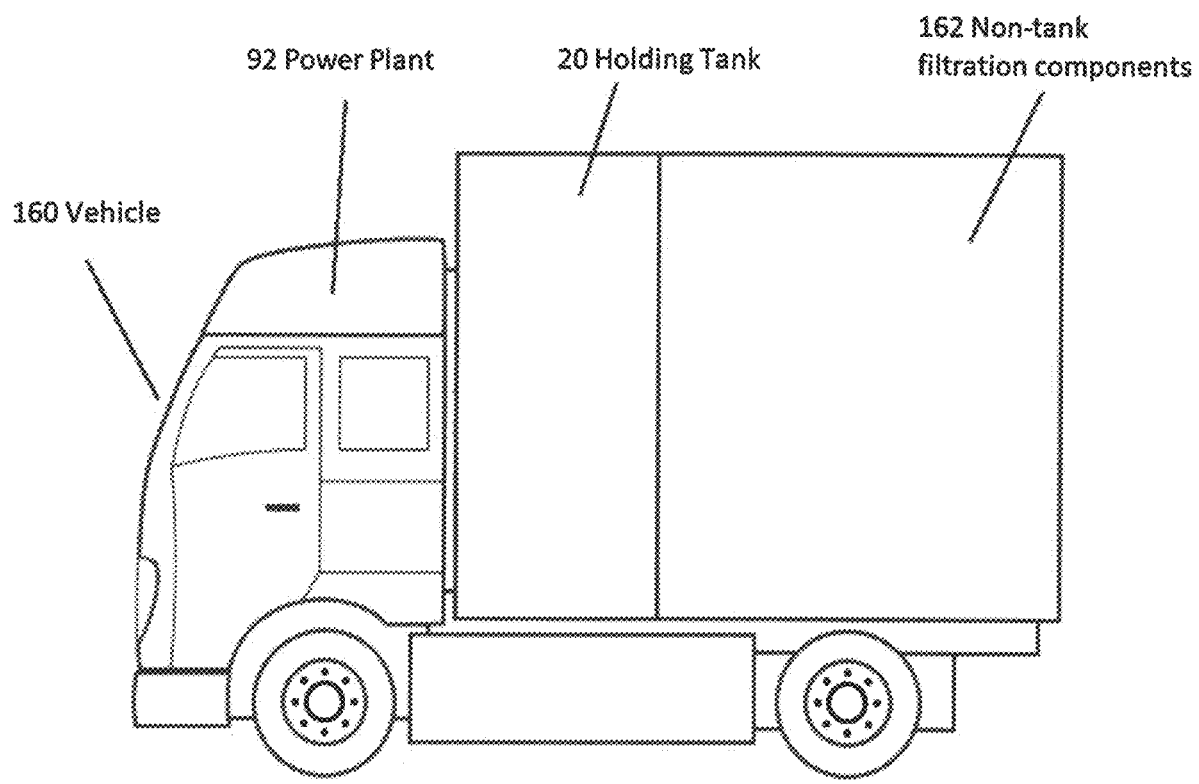
FIG. 8 is a side view of an embodiment of the invention emphasizing a possible mobile arrangement of the invention.

Turning to FIG. 8, a mobile version of the system 10 is shown. For purposes of illustration, the components of the system 10 have been blown outward in the figures. In some embodiments, a non-mobile system, as depicted, can be placed on site. However, it is more typical that the system will be compacted and constructed as a mobile system so that it can be easily transported from tank to tank.

In the mobile system depicted, a vehicle 160 is provided, typically a large truck. The power unit 92 is placed upon the vehicle 160, and the holding tank 20 and non-tank filtration and treatment component array 162 are placed within the vehicle 160. In this arrangement, the system 10 can be moved from tank to tank to provide cleaning and treatment for multiple tanks.

Figure 9:
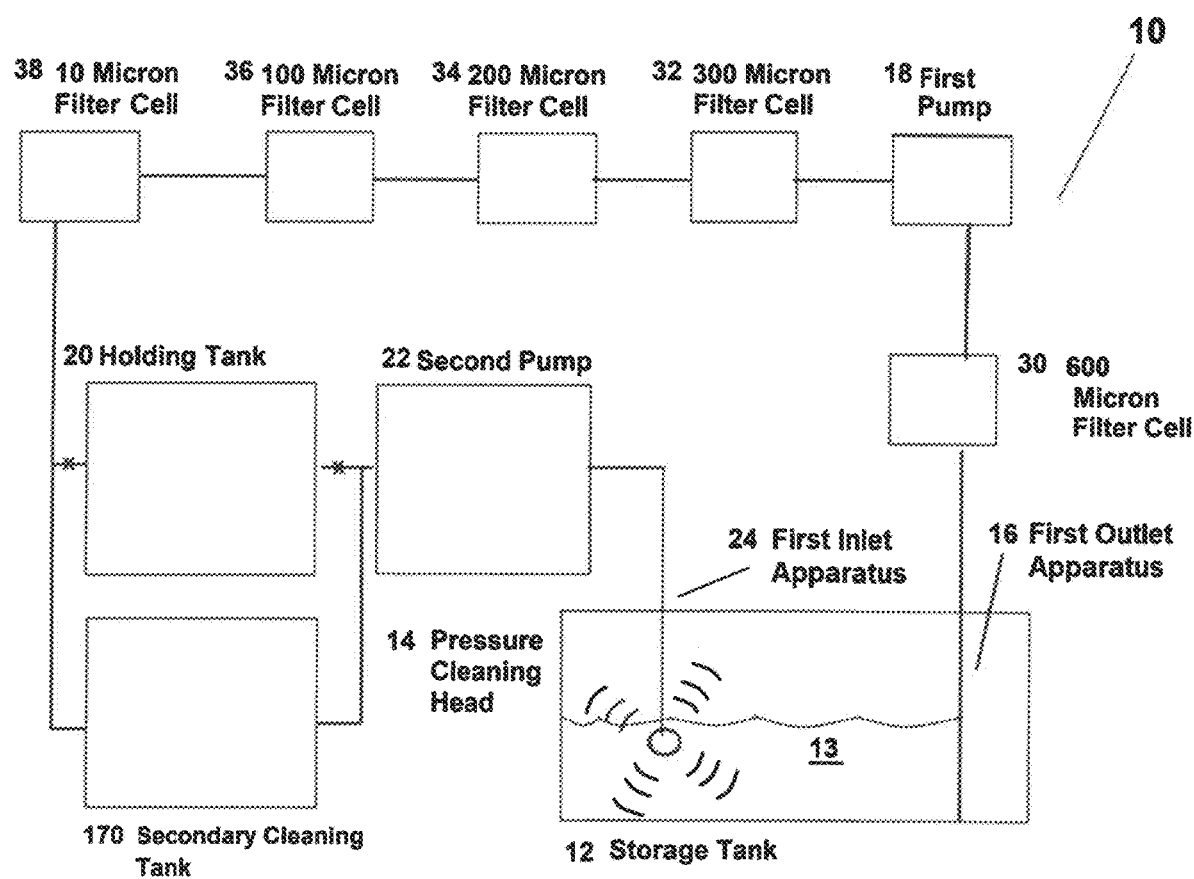
FIG. 9 is a schematic flow diagram showing an alternative embodiment of the invention.

Turning to FIG. 9, in other embodiments, it is to be understood that the method and apparatus herein can be altered to provide complete cleaning of tanks for non-use. For example, sites that contained tanks, particularly underground tanks, for use, may require cleaning to meet environmental standards. For example, if the land a former filling station with one or more underground tanks is to be converted for another use or reverted back to natural use, environmental regulations require that the site be decontaminated to a satisfactory level. Otherwise, fuel, or even only a sediment layer, left behind in the tank is likely to leach into the surrounding ground water as the tank disintegrates over time. A number of former filling stations can even become superfund sites requiring a full remediation. In some situations, this includes removal of any underground tanks for disposal of the tank and contents elsewhere.

However, often, removing the tank is prohibitively expensive, or likely to create other problems with site cleanup. At these times, a preferred solution would be to fully clean the inside of the tank and leave the tank on site to eventually disintegrate harmlessly. However, such cleaning of a tank inside is difficult or unlikely, or in some cases impossible, with current methods that leave a bottom layer of contaminant.

Returning briefly to FIG. 2, if there is fuel 13 remaining in a tank 12, the fuel can be pumped out into the holding tank 20 and removed entirely. This process and apparatus can be adjusted to a particular tank cleaning situation. In this embodiment, remaining fuel can be pumped out and filtered via the filter set 30, 32, 34, 36, 38, streamed from the pressure cleaning head 14, used to break down any layer, clumps, or collected particulates, and cycled through the system 10 as many times as sufficient to complete the task. When finished, the fuel is left in the holding tank 20.

Turning to FIG. 9, if the tank is to be cleaned of fuel entirely, such as, e.g., in an environmental remediation or tank removal situation, and there is little or no fuel remaining, the holding tank 20 can be disconnected from the system 10 after the fuel 13 is removed from the storage tank 12. Then soapy water or other suitable cleaning fluid can be pumped and circulated from an secondary cleaning tank 170 and through the system in a manner similar to that as fuel 13 from the tank 12. It is noted that additional cleaning agents (for example, break down residual gasoline or other particles or pull them from the tank 12) can also be added to the cleaning fluid as appropriate. The soapy water or other cleaning fluid can also be used to stream, from the pressure cleaning head 14, then cycled through the system 10 to clean the inner surface of the tank 12, until a suitable level of cleanliness is reached.

After the tank is sufficiently clean, it can be filled with sand or inert substance, if appropriate, leaving behind a non-contaminant tank that is now of little or no concern.

In summary, this system, in a basic embodiment, cycles fuel or other product from a storage tank 12 to be cleaned through a series of filter cells 30, 32, 34, 36, 38 and treatments, and stores the fuel inside an outside tank. This filtered and polished fuel is then used to "pressure wash" the inside of the storage tank with a pressure cleaning head apparatus 14, whereupon the fuel 13 can be pumped back into the system 10 and circulated through the filter cells 30, 32, 34, 36, 38 to be cleaned, filtered, and polished again, until the fuel and tank are fully and satisfactorily cleaned.

This invention provides a system and method for not simply maintaining a storage tank, but of emptying the entire storage tank of its product and providing a complete and thorough cleaning of the tank, as well as providing protective maintenance of the complete inner surface of the storage tank, thereby lengthening the amount of time between cleanings and increasing the useful life of the storage tank. The system also provides a more efficient cleaning process with less costly downtime for the storage tank.

It is to be understood that while certain forms of the present invention have been illustrated and described herein, the expression of these individual embodiments is for illustrative purposes and should not be seen as a limitation upon the scope of the invention. It is to be further understood that the invention is not to be limited to the specific forms or arrangements of parts described and shown.

The invention claimed is:

1. A method of cleaning a fuel storage tank comprising the steps of:

providing a first tank outlet apparatus configured to facilitate removal of a liquid comprising fuel, deposits, or both from the fuel storage tank, providing at least a first pump capable of pumping at least a portion of the liquid from the fuel storage tank, providing at least one filter cell configured to accept the liquid and provide at least one level of filtration to the liquid, providing at least one drainage line located within and at a bottom of the at least one filter cell, providing an inclined ramp positioned in said at least one filter cell such that one end of the inclined ramp is located at about a level of the at least one drainage line, providing at least one pressure treating head configured to provide a pressurized flow of the liquid and rotational movement of the pressure treating head within the fuel storage tank, providing at least one holding tank configured to accept and hold at least a portion of the liquid after it has gone through the at least one filter cell, providing at least a secondary pump configured to provide the pressurized flow of the liquid between the at least one holding tank and the at least one pressure treating head, wherein the first tank outlet apparatus, the at least a first pump, the at least one filter cell, the at least one holding tank, the at least a secondary pump, and the at least one pressure treating head are configured to be in liquid communication, pumping the at least a portion of the liquid from the fuel storage tank using the first pump, removing an amount of the liquid from the storage tank via the first tank outlet apparatus, filtering the liquid through the at least one filter cell, preventing accumulation of deposits in the liquid at the bottom of the at least one filter cell during filtering by sliding said deposits to the inclined ramp and into said at least one drainage line, transferring the liquid into the at least one holding tank, pumping the portion of liquid from the at least one holding tank and through the at least one pressure treating head using the at least one secondary pump, and transferring the portion of the liquid back into the fuel storage tank.

2. A method of cleaning a fuel storage tank, according to claim 1, wherein the step of filtering the liquid further comprises:

filtering the liquid through the at least one filter cell in a first filtration step, and further filtrating the liquid through a series of additional filter cells of finer gradation than the at least one filter cell, and increasingly finer filtration relative to each other.

3. A method of cleaning a fuel storage tank, according to claim 1, further comprising the step of:

providing at least one treatment to the liquid in the at least one holding tank after filtering the liquid.

4. A method of cleaning a fuel storage tank, according to claim 1, wherein the at least one filter cell is comprised of a series of graduated filter cells.

5. A method of cleaning a fuel storage tank, according to claim 1, further comprising the step of providing a tank inlet apparatus, and wherein the tank inlet apparatus, the tank outlet apparatus, or both are comprised of a retractable hose and reel arrangement.

6. A method of cleaning a fuel storage tank, according to claim 1, further comprising the step of:

providing a waste treatment/removal sub-system comprised of:

at least one additional filter cell in liquid communication with the at least one drainage line, and transferring the liquid from the at least one additional filter cell to a waste removal tank.

7. A method of cleaning a fuel storage tank, according to claim 1, further comprising the steps of:

providing a waste removal tank, and providing a waste removal line, wherein the waste removal line is in liquid communication with the waste removal tank, and direct or indirect liquid communication with the at least one drainage line.

8. A method of cleaning a fuel storage tank, according to claim 1, further comprising the step of providing a vehicle for transporting the at least one holding tank.

9. A method of cleaning a fuel storage tank, according to claim 1, further comprising the step of:

providing at least one secondary cleaning tank.

* * * * *